United States Patent [19]

Stratmann et al.

[11] 4,247,074
[45] Jan. 27, 1981

[54] CASTING MOLD FOR ALUMINOTHERMICALLY WELDING RAILS TOGETHER

[75] Inventors: Josef Stratmann, Essen; Wilfried Möring, Essen-Haarzopf; Gerhard Skreba, Essen, all of Fed. Rep. of Germany

[73] Assignee: Elektro-Thermit GmbH, Fed. Rep. of Germany

[21] Appl. No.: 67,410

[22] Filed: Aug. 17, 1979

[30] Foreign Application Priority Data

Aug. 31, 1978 [DE] Fed. Rep. of Germany ....... 2837986

[51] Int. Cl.³ .................... B22D 19/04; B23K 23/00
[52] U.S. Cl. ...................... 249/86; 164/54; 164/333
[58] Field of Search ............... 164/333, 53, 54, 108, 164/DIG. 12; 249/86

[56] References Cited

U.S. PATENT DOCUMENTS

| 2,932,863 | 4/1960 | Ahlert | 164/333 X |
| 3,007,217 | 11/1961 | Ahlert | 164/54 X |
| 3,113,359 | 12/1963 | Burke | 164/333 |
| 3,620,291 | 11/1971 | Delachapelle | 164/54 X |
| 4,190,228 | 2/1980 | Bommart | 249/86 |

FOREIGN PATENT DOCUMENTS 201440  4/1955  Australia ..................... 249/86

Primary Examiner—Robert D. Baldwin
Assistant Examiner—J. Reed Batten, Jr.
Attorney, Agent, or Firm—James E. Bryan

[57] ABSTRACT

This invention relates to a prefabricated casting mold for aluminothermically welding rail ends spaced apart by a gap while simultaneously welding shut a fishplate hole in the region of each rail end, comprising two mold halves which, when assembled, form a cavity adapted to enclose the rail ends and being so widened in the region of the rail web and in the longitudinal direction of the rails that the two fishplate holes are located within the cavity, a pair of riser channels in each mold half, at least one of the riser channels in each half issuing centrally into the rail base region of the casting mold cavity and having at least one means of communication with the casting mold cavity in the rail web region, and the other of the riser channels in each mold half communicating with the casting mold cavity in the vicinity of a fishplate hole.

4 Claims, 4 Drawing Figures

CASTING MOLD FOR ALUMINOTHERMICALLY WELDING RAILS TOGETHER

This invention relates to a prefabricated casting mold composed of two mold halves, for the aluminothermic weld-joining of rails, arranged with a mutual gap and for welding shut each fishplate hole in the rail end region.

When joining by aluminothermic welding, there frequently is the problem of welding together two rail ends with fishplate holes. This will be the case for instance when a continuous, electrically conducting weld is intended to replace an insulated joint for which latter the two rail ends ordinarily are connected by fishplates which are insulated with respect to these rails, these fishplates being bolted together with the rails by very tight bolts.

When such rail ends with fishplate holes are welded together, the heat flux in the region of the fishplate holes neighboring the weld will be hampered and interfered with. Accordingly, there frequently are stress cracks during welding and during and/or after cooling of the weld in the region of the fishplate holes near the weld, and these cracks can lead to rail damage.

To prevent this from happening, the state of the art removes the insulated joint together with the rail ends over a length of several meters, whereupon a correspondingly long rail segment is inserted and aluminothermically welded at both sides. Accordingly, two aluminothermic weldings are required. While this procedure is defect-free and satisfactory in principle and practice, it is nevertheless somewhat costly.

For the purpose of using only a single aluminothermic weld, the fishplate holes adjacent to the welding site furthermore have been preheated to about 450° C. and then have been electrically welded shut, whereafter the aluminothermic welding is performed. However, great care is required when welding the fishplate holes shut. When it is performed on the actual construction site, deficiencies in the form of welding defects are frequently encountered. Such a procedure furthermore entails intensive labor because electrical and aluminothermic weldings as a rule must be performed by different and correspondingly trained construction personnel.

Lastly, it is also possible to aluminothermically weld the fishplate holes shut using special casting forms. But this process is complex and costly in any case, as three weldings must be performed.

It is, therefore, an object of this invention to provide a way of simultaneously performing the junction welding and the filling welding (welding shut) of the fishplate holes by performing a single aluminothermic welding operation.

This is achieved by the present invention using a prefabricated casting mold composed of two mold halves. The mold has a cavity enclosing the rail ends and is so widened in the region of the web in the longitudinal rail direction that the two fishplate holes are located within the casting mold cavity. Riser channels are provided of which at least one issues centrally into the web region and additionally it communicates at least once with the casting mold cavity in the region of the rail web. At least one riser channel communicates with the casting mold cavity in the region of every fishplate hole.

In a special embodiment of the casting mold, the casting mold cavity widens in the rail web region in the longitudinal rail direction from the underside of the rail head to the rail base.

When assembling the casting mold, two mutually identical mold halves are appropriately used. It is sufficient that each mold half have only a single riser channel in the region of a fishplate hole. When the two mold halves are put together, the two riser channels then will be mutually diagonally offset in the region of the fishplate holes.

When welding, a welding bead is formed in the region of the rail web, the bead being relatively wide and thereby the two fishplate holes located in the region of the flat, wide bead are filled by the aluminothermically generated metal melt. The bead will taper in the manner of a roof toward the rail head in the region of the web when the preferred casting mold is used.

It must be expected from such a wide bead that the non-uniform heat drainage in the region of the head, web and base of the rail, especially at the web, would result in casting defects, for instance due to internal stress formation and to segregation. As regards the ordinary rail junction welding of the state of the art, care has always been exercised on that ground that the fusion zone of rail welding be kept as narrow as possible and as uniform as possible in the longitudinal rail direction. The present invention departs from this principle for the first time. It was surprisingly found that by using the mold of the invention the occurrence of defective welds is eliminated. It is presumed this is due among other factors to the communication of the riser channel in the region of the rail web. As a result, even after the solidification of the rail head, which takes place earlier due to increased heat drainage than in the region of the web, welding material is additionally supplied, thereby eliminating segregation and stress cracking.

The invention will be further illustrated by reference to the accompanying drawings, in which:

FIG. 3a shows a weld achieved using the mold of the present invention in a side view, and FIG. 3b is a view in cross-section of the weld of FIG. 3a taken along line IIIb—IIIb of FIG. 3a.

Figure 1:
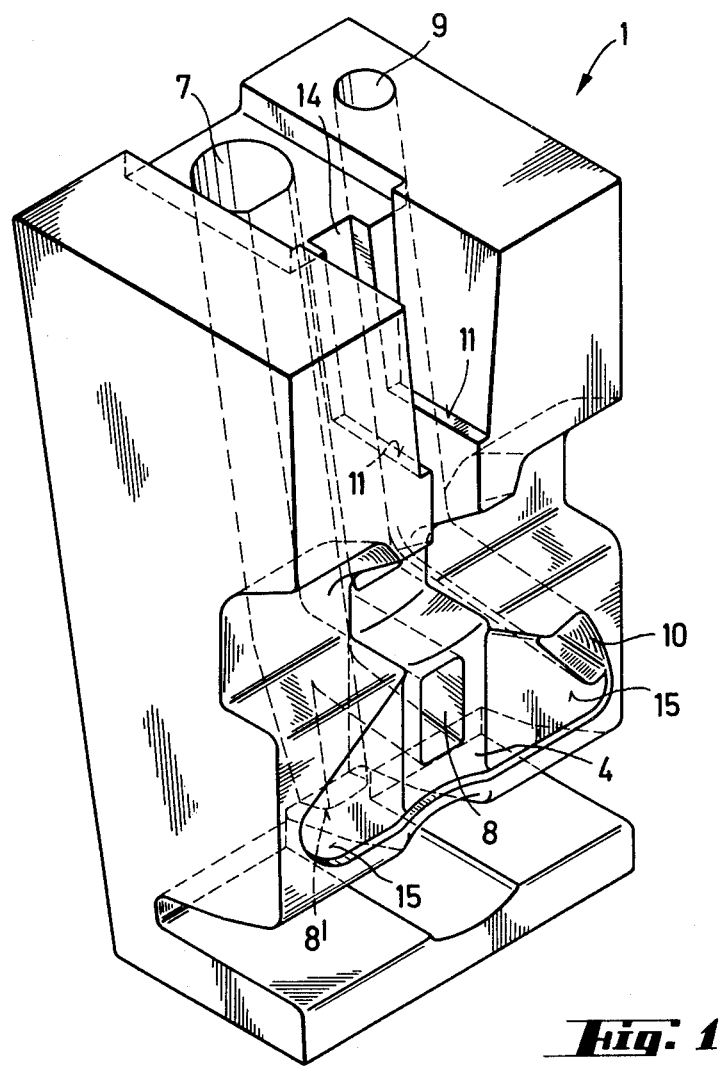
FIG. 1 shows one of the two symmetrical mold halves.

FIG. 1 shows the casting mold 1. It also shows that half of the casting mold cavity which determines the exterior shape of the welding bead. The riser channel 7 extends within the mold downwardly toward the rail base, the channel additionally communicating with the the rail web region 4 through the orifice 8. The riser 9 issues into the casting mold cavity in the region 10. The projections 11 are mounted at the upper part of the casting mold, which provide a support for a casting lock 12.

Figure 2:
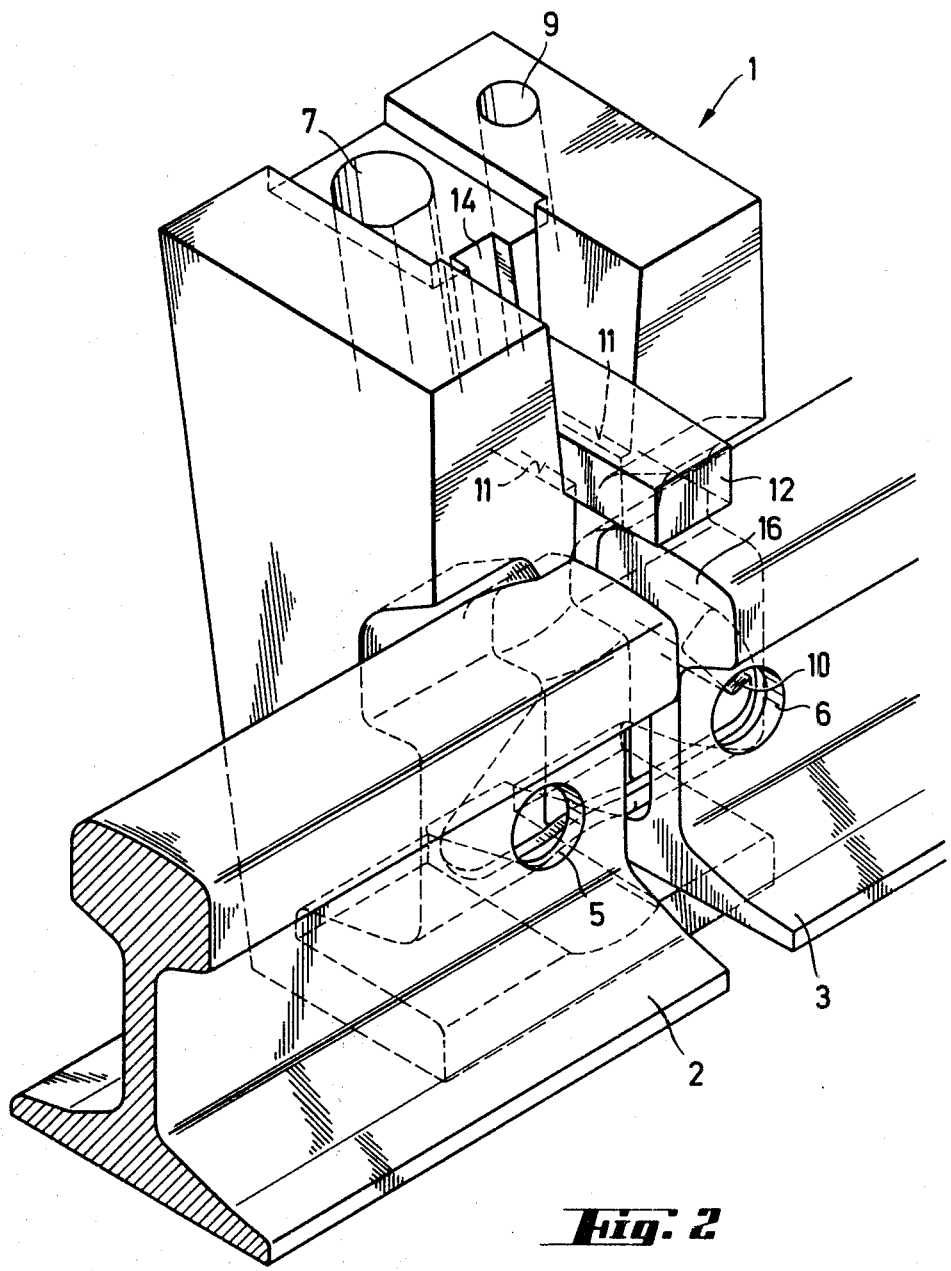
FIG. 2 shows that mold half which is placed against the two rail ends and in which a casting lock is inserted.
Figures 3, 3A, 3B:
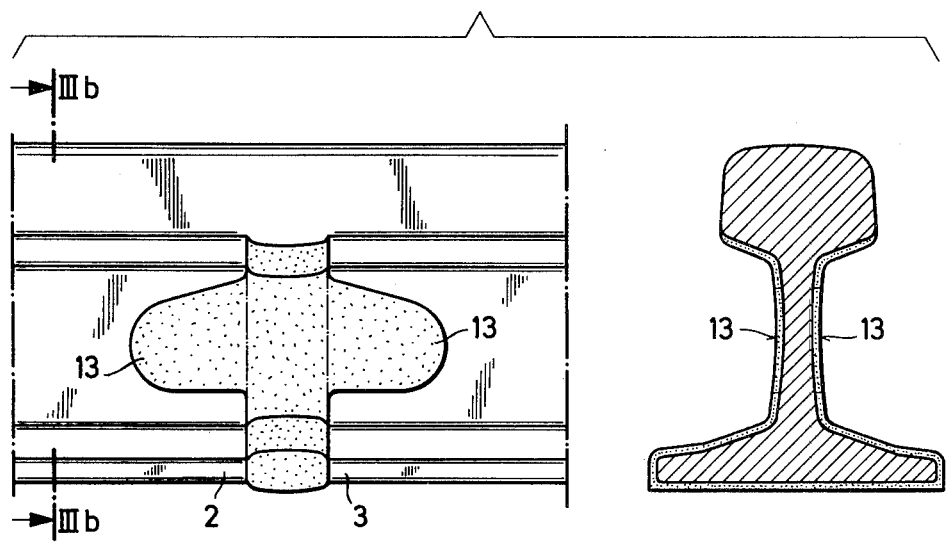

This casting lock 12 is shown in FIG. 2. It distributes the aluminothermically generated steel melt flowing into the mold. This melt is generated in a casting crucible mounted above the mold. When performing the welding, the mold and the rail ends 2 and 3 are preheated to temperatures between 900° and 1,200° C. by flames impinging from above into the casting mold. Thereupon the lock is placed into the mold and the aluminothermic reaction mixture in the casting crucible is ignited. Upon completion of the aluminothermic reaction and separation of the slag from the metal melt, the crucible (not shown) is tapped. The metal melt flows into the casting mold onto the casting lock, past the two narrow sides of the lock through the flow guides 14 into the casting mold cavity, and first fills the mold in the vicinity of the rail base. Once the rail base region is filled, the metal melt passes through the hollow spaces in the form of approximately triangular pockets 15, through the web bores 5 and 6, and the openings 10 into the risers 9, and thus fills the mold. Simultaneously, the melt from the gap 16 of the rail joint passes through the openings 8 and 8' into the risers 7. Then the melt is allowed to solidify. After solidification, the mold is removed. The risers then can be removed for instance using a compressed air chisel. A rail junction weld is thus obtained, in which in the region of the rail web preferably evidences two triangular flat beads 13 on both sides. Note FIG. 3a where the riser sprue was chiselled off so that a symmetric bead was obtained. The weld is free from welding defects and can be subjected to ordinary traffic loads. The rail head is shown after grinding in FIG. 3b.

It will be obvious to those skilled in the art that many modifications may be made within the scope of the present invention without departing from the spirit thereof, and the invention includes all such modifications.

What is claimed is:

1. A prefabricated casting mold for aluminothermically welding rail ends spaced apart by a gap while simultaneously welding shut a fishplate hole in the region of each rail end, comprising two mold halves which, when assembled, form a cavity adapted to enclose the rail ends and being so widened in the region of the rail web and in the longitudinal direction of the rails that the two fishplate holes are located within said cavity, a pair of riser channels in each mold half, at least one of said riser channels in each half issuing centrally into the rail base region of said casting mold cavity and having at least one means of communication with the casting mold cavity in the rail web region, and the other of said riser channels in each mold half communicating with the casting mold cavity in the vicinity of a fishplate hole.

2. A casting mold according to claim 1 in which the casting mold cavity widens in the longitudinal rail direction in the web region thereof from the underside of the rail head toward the rail base.

3. A casting mold according to claim 1 in which said riser channels in each mold half communicating with the casting mold cavity in the vicinity of a fishplate hole are diagonally offset in the assembled mold.

4. A casting mold according to claim 1 including approximately triangular flat mold pockets for communication of the riser channels with the casting mold cavity in the vicinity of the fishplate holes.

* * * * *